US010638653B2

(12) United States Patent
Anderson et al.

(10) Patent No.: US 10,638,653 B2
(45) Date of Patent: May 5, 2020

(54) CASTER WHEEL ASSEMBLY FOR AN AGRICULTURAL IMPLEMENT SYSTEM

(71) Applicant: CNH Industrial America LLC, New Holland, PA (US)

(72) Inventors: Brian John Anderson, Yorkville, IL (US); Nicholas Ryan Pederson, Willmar, MN (US); William Schroeder, Downers Grove, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 560 days.

(21) Appl. No.: 15/286,197

(22) Filed: Oct. 5, 2016

(65) Prior Publication Data

US 2018/0092286 A1    Apr. 5, 2018

(51) Int. Cl.
*A01B 63/16* (2006.01)
*B60B 33/06* (2006.01)
(Continued)

(52) U.S. Cl.
CPC ............ *A01B 63/16* (2013.01); *A01B 63/002* (2013.01); *A01B 63/22* (2013.01); *B60B 33/02* (2013.01);
(Continued)

(58) Field of Classification Search
CPC ........ A01B 63/002; A01B 63/16; A01B 63/22
(Continued)

(56) References Cited

U.S. PATENT DOCUMENTS 2,353,659 A * 7/1944 Frank .................. A01B 63/163
172/386
3,162,459 A    12/1964 Marmorine et al.
(Continued)

FOREIGN PATENT DOCUMENTS

CA      1331842        9/1994
EP      0700821 A1     3/1996

OTHER PUBLICATIONS

U.S. Appl. No. 15/093,325, filed Apr. 7, 2016, Alihaider Maniar.
(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A caster wheel assembly includes a frame configured to pivotally couple to a tool bar, a sub-frame rotatably coupled to the frame, and a connecting linkage configured to control movement of the frame relative to the tool bar. The caster wheel assembly also includes a locking assembly, which includes a lock lever movably coupled to the frame, wherein the lock lever includes a locking element and a release element, a locking structure fixedly coupled to the sub-frame, and a driving element fixedly coupled to the connecting linkage. The locking element is configured to block rotation of the sub-frame relative to the frame while the locking element is engaged with the locking structure, and the driving element is configured to contact the release element as the connecting linkage moves the frame downwardly relative to the tool bar to drive the locking element to disengage the locking structure.

18 Claims, 6 Drawing Sheets

(51) Int. Cl.
B60B 33/02 (2006.01)
A01B 63/00 (2006.01)
A01B 63/22 (2006.01)

(52) U.S. Cl.
CPC ......... B60B 33/066 (2013.01); B60B 33/026 (2013.01); B60Y 2200/22 (2013.01)

(58) Field of Classification Search
USPC ....................................................... 172/386
See application file for complete search history.

(56) References Cited

U.S. PATENT DOCUMENTS

| | | | |
|---|---|---|---|
| 3,324,956 A * | 6/1967 | Ritchie | ............... A01B 69/006 172/386 |
| 3,705,560 A | 12/1972 | Lappin | |
| 3,982,773 A | 9/1976 | Stufflebeam et al. | |
| 4,026,365 A | 5/1977 | Andersson et al. | |
| 4,119,156 A | 10/1978 | Wheeler et al. | |
| 4,137,852 A | 2/1979 | Pratt | |
| 4,212,483 A | 7/1980 | Howard | |
| 4,359,105 A | 11/1982 | Van Natta | |
| 4,368,806 A * | 1/1983 | Raineri | ................... B60B 33/02 172/386 |
| 4,566,553 A | 1/1986 | McCutcheon | |
| 4,739,930 A | 4/1988 | Pask | |
| 4,944,355 A | 7/1990 | Karchewski | |
| 5,660,237 A | 8/1997 | Boyko et al. | |
| 5,829,370 A | 11/1998 | Bender | |
| 6,076,613 A | 6/2000 | Frasier | |
| 6,112,827 A | 9/2000 | Reiber et al. | |
| 6,374,923 B1 | 4/2002 | Friggstad | |
| 6,860,335 B2 | 3/2005 | Arnett | |
| 7,147,241 B2 | 12/2006 | Beaujot et al. | |
| 7,447,585 B2 | 11/2008 | Tandy, Jr. et al. | |
| 7,549,482 B2 | 6/2009 | Wake et al. | |
| 7,581,597 B2 | 9/2009 | Neudorf et al. | |
| 7,731,302 B2 | 6/2010 | Tandy, Jr. et al. | |
| 7,798,263 B2 | 9/2010 | Tandy, Jr. et al. | |
| 7,849,932 B2 | 12/2010 | Friggstad et al. | |
| 8,127,861 B2 | 3/2012 | Meek | |
| 8,235,133 B2 | 8/2012 | Friggstad | |
| 8,700,269 B2 | 4/2014 | Hubalek | |
| 9,037,346 B2 | 5/2015 | Keys, II et al. | |
| 9,096,264 B2 | 8/2015 | Connors et al. | |
| 9,198,342 B2 | 12/2015 | Friggstad | |
| 9,474,199 B2 | 10/2016 | Sudbrink et al. | |
| 9,681,598 B2 | 6/2017 | Anderson et al. | |
| 9,907,223 B2 * | 3/2018 | Dienst et al. | ........ A01B 73/065 |
| 2008/0217093 A1 | 9/2008 | Foxwell | |
| 2014/0262376 A1 | 9/2014 | Redekop | |
| 2015/0156947 A1 * | 6/2015 | Sudbrink et al. | ...... A01B 63/22 172/421 |
| 2015/0156955 A1 | 6/2015 | Sudbrink et al. | |
| 2015/0232088 A1 | 8/2015 | Tagesson et al. | |
| 2017/0006762 A1 | 1/2017 | Dienst et al. | |

OTHER PUBLICATIONS

U.S. Appl. No. 15/093,094, filed Apr. 7, 2016, Marvin A. Prickel.
Great Plains Manufacturing, Inc., Operators Manual YP4010HD, YP4025 and YP0425F, 40 Foot 3-Section Yield-Pro® Planter, 2009, pp. 1, 32-33, and 35.

* cited by examiner

CASTER WHEEL ASSEMBLY FOR AN AGRICULTURAL IMPLEMENT SYSTEM

BACKGROUND

The present disclosure relates generally to agricultural implements. Specifically, the embodiments disclosed herein generally relate to a caster wheel assembly for an agricultural implement system.

Many types of farming implements are used for a variety of tasks, such as tilling, planting, and harvesting. For example, seeders and planters are agricultural implements that include row units for creating trenches in soil, depositing seeds into the trenches, and filling the trenches with the displaced soil. A seeding/planting agricultural implement may include a tool bar having a central section coupled to a tow bar and wing sections coupled to either side of the central section. The row units are typically coupled to the tool bar to perform planting/seeding operations. In addition, supporting wheel assemblies may be coupled to the wing section to support the wing section during operation and transport. During planting/seeding operations, the wheel assemblies may be mound to a raised position such that the row units contact the soil with sufficient force to deposit seeds into the soil at a desired depth. While the wheel assemblies are in the raised position, the wheels are locked from swiveling or castering. During transport, the wheel assemblies are lowered relative to the tool bar, and the wheels are unlocked, such that the wheels may swivel or caster. Swiveling or castering of the wheels may facilitate turning of the agricultural implement.

Typical wheel assemblies include a wheel locking system to selectively lock and unlock the wheels. Unfortunately, wheel locking systems typically include complex assemblies, such as linkages, to selectively lock and unlock the wheels. Such assemblies increase the cost and complexity of the agricultural implement.

BRIEF DESCRIPTION

In one embodiment, a caster wheel assembly for an agricultural implement system includes a frame configured to pivotally couple to a tool bar of the agricultural implement system via a mount, a sub-frame rotatably coupled to the frame, and at least one connecting linkage configured to control movement of the frame relative to the tool bar. The caster wheel assembly also includes a locking assembly, which includes a lock lever movably coupled to the frame, wherein the lock lever comprises a locking element and a release element, a locking structure fixedly coupled to the sub-frame, and a driving element fixedly coupled to the at least one connecting linkage. The locking element is configured to block rotation of the sub-frame relative to the frame while the locking element is engaged with the locking structure, and the driving element is configured to contact the release element as the at least one connecting linkage moves the frame downwardly relative to the tool bar to drive the locking element to disengage the locking structure.

In another embodiment, a caster wheel assembly for an agricultural implement system includes a frame configured to pivotally couple to a tool bar of the agricultural implement system via a mount, a sub-frame rotatably coupled to the frame, and at least one connecting linkage configured to control movement of the frame relative to the tool bar. The caster wheel assembly also includes a locking assembly, which includes a lock lever movably coupled to the frame, wherein the lock lever comprises a locking element, a locking structure fixedly coupled to the sub-frame, and an actuator assembly comprising an actuator extending between the frame and the lock lever. The locking element is configured to block rotation of the sub-frame relative to the frame while the locking element is engaged with the locking structure, and the actuator is configured to drive the lock lever in a first direction to engage the locking element with the locking structure and to drive the lock lever in a second direction, opposite the first direction, to disengage the locking element from the locking structure.

In a further embodiment, a caster wheel assembly for an agricultural implement system includes a frame configured to pivotally couple to a tool bar of the agricultural implement system via a mount, a sub-frame rotatably coupled to the frame, at least one connecting linkage configured to control movement of the frame relative to the tool bar, and a locking assembly. The locking assembly includes a lock lever pivotally coupled to the frame about a shaft assembly, wherein the lock lever comprises a locking element and a release element. The locking assembly includes a locking structure fixedly coupled to the sub-frame, wherein the locking structure comprises a locking plate, and the locking plate has a slot configured to receive the locking element of the lock lever to block rotation of the sub-frame relative to the frame. The locking assembly includes a driving element fixedly coupled to the at least one connecting linkage, wherein the driving element is configured to contact the release element as the at least one connecting linkage moves the frame downwardly relative to the tool bar to drive the locking element to disengage the locking structure. The locking assembly also includes a biasing member configured to urge the locking element of the lock lever into engagement with the locking structure.

DRAWINGS

These and other features, aspects, and advantages of the present disclosure will become better understood when the following detailed description is read with reference to the accompanying drawings in which like characters represent like parts throughout the drawings, wherein.

Figure 2:
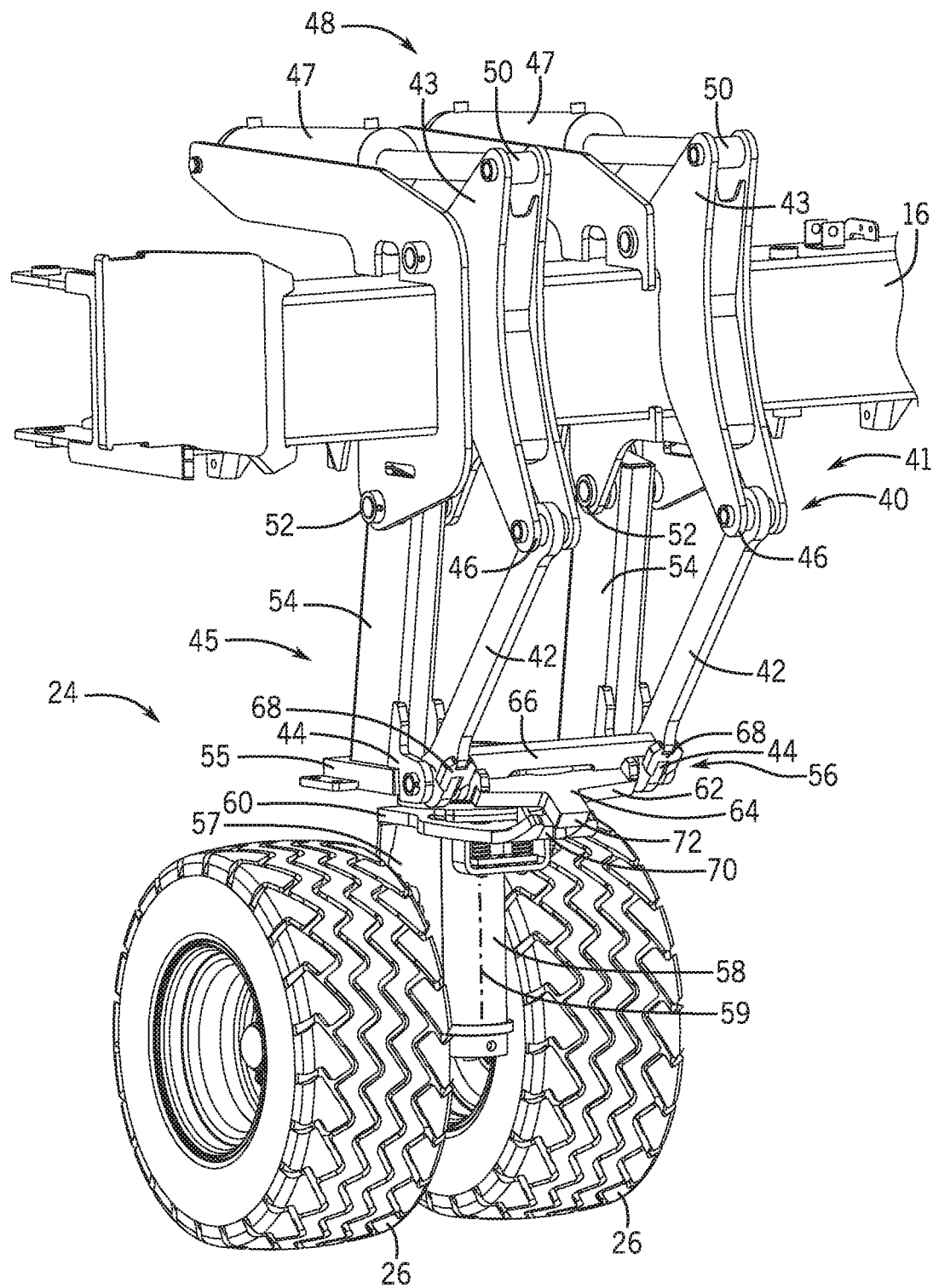
FIG. 2 is a perspective view of one caster wheel assembly of FIG. 1, in which a lock lever of a locking assembly is in a fully released/unlocked position, such that caster wheels of the caster wheel assembly may swivel, in accordance with an embodiment of the present approach.
Figure 5:
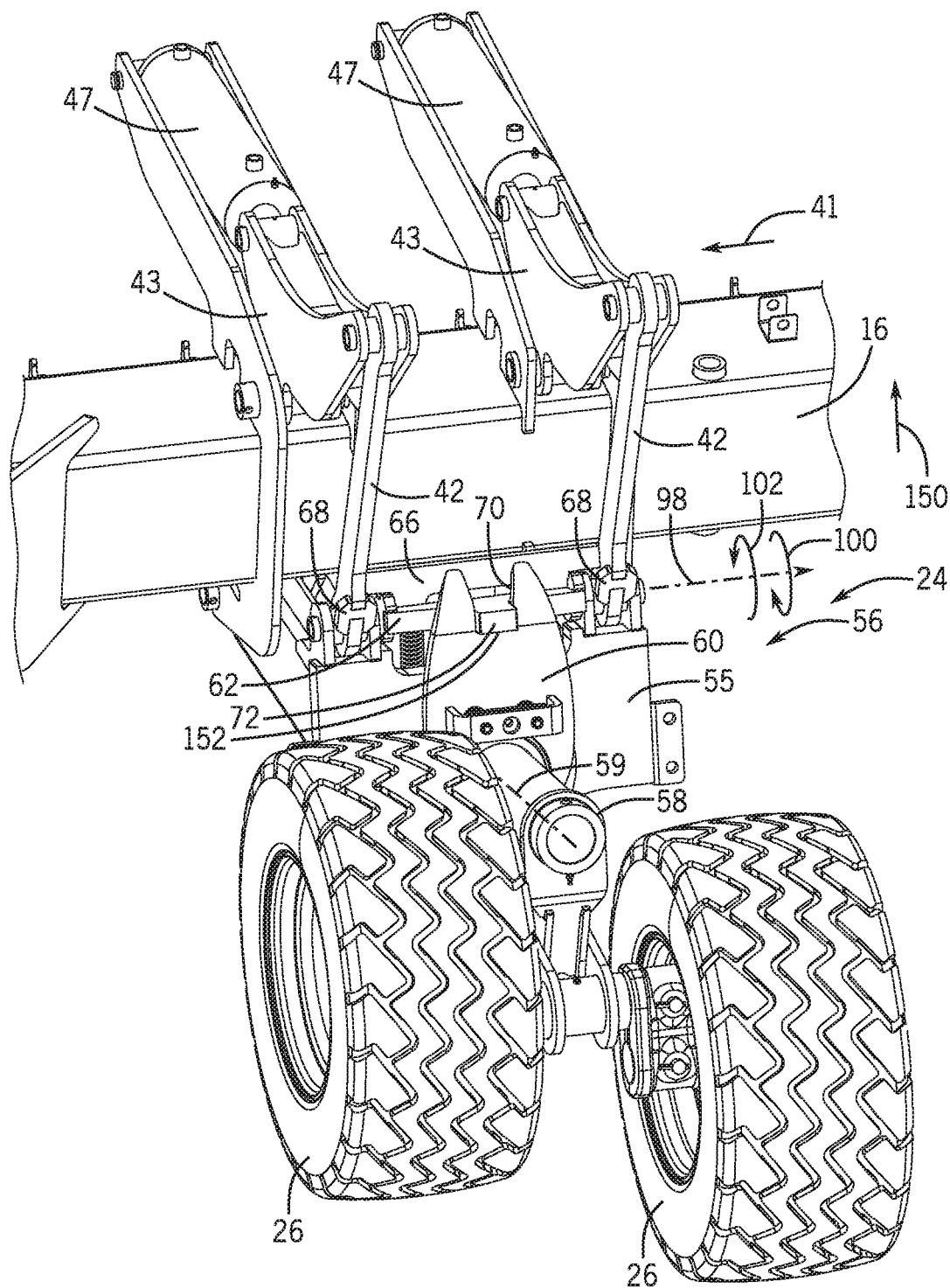
Figure 6:
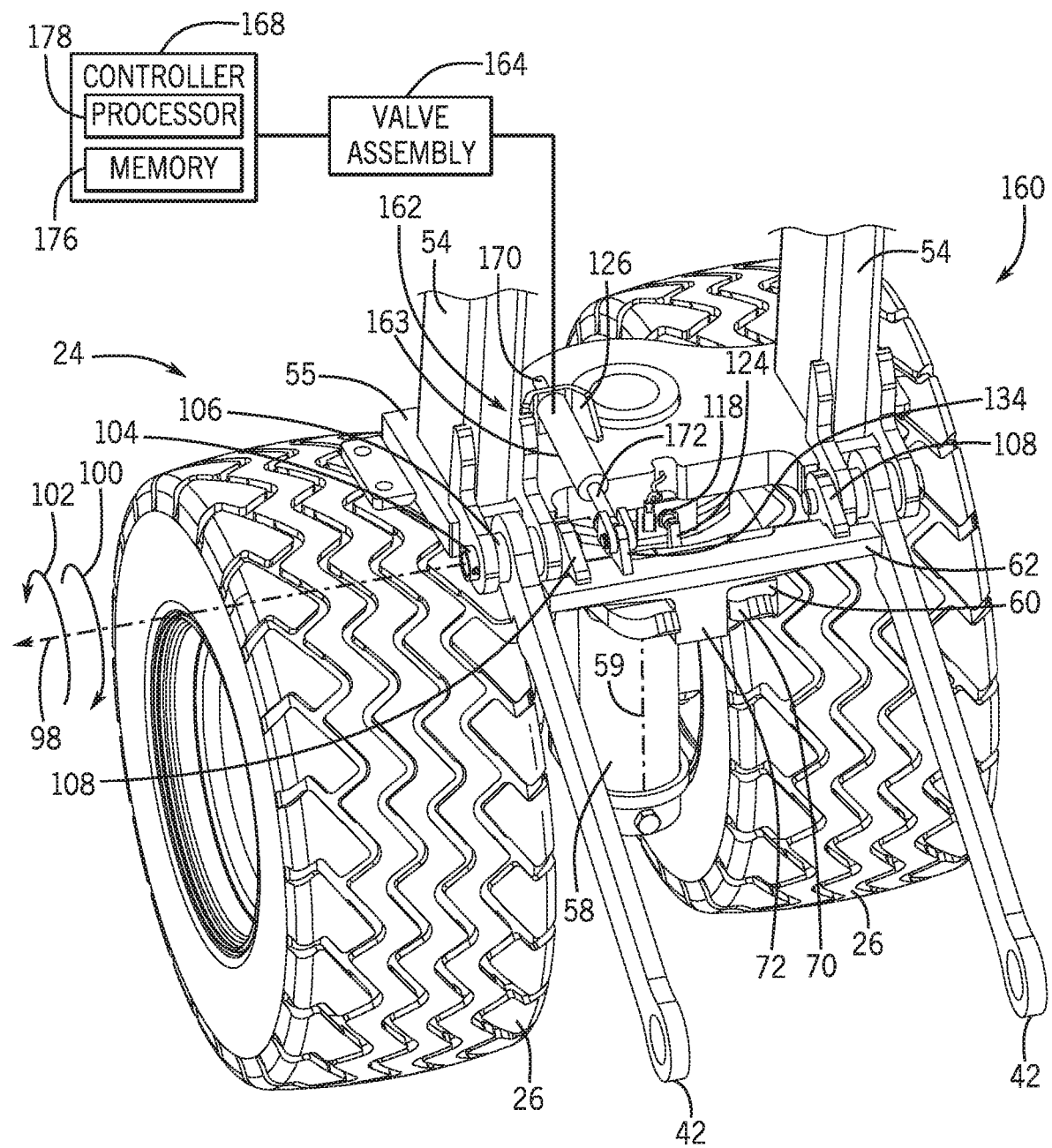

FIG. 5 is a perspective view of the caster wheel assembly of FIG. 2, in which the lock lever is in the locked position, such that the locking assembly blocks the caster wheels from swiveling, in accordance with an embodiment of the present approach; and FIG. 6 is a perspective view of a caster wheel assembly having another embodiment of a locking assembly, in accordance with an embodiment of the present approach.

DETAILED DESCRIPTION

Figure 1:
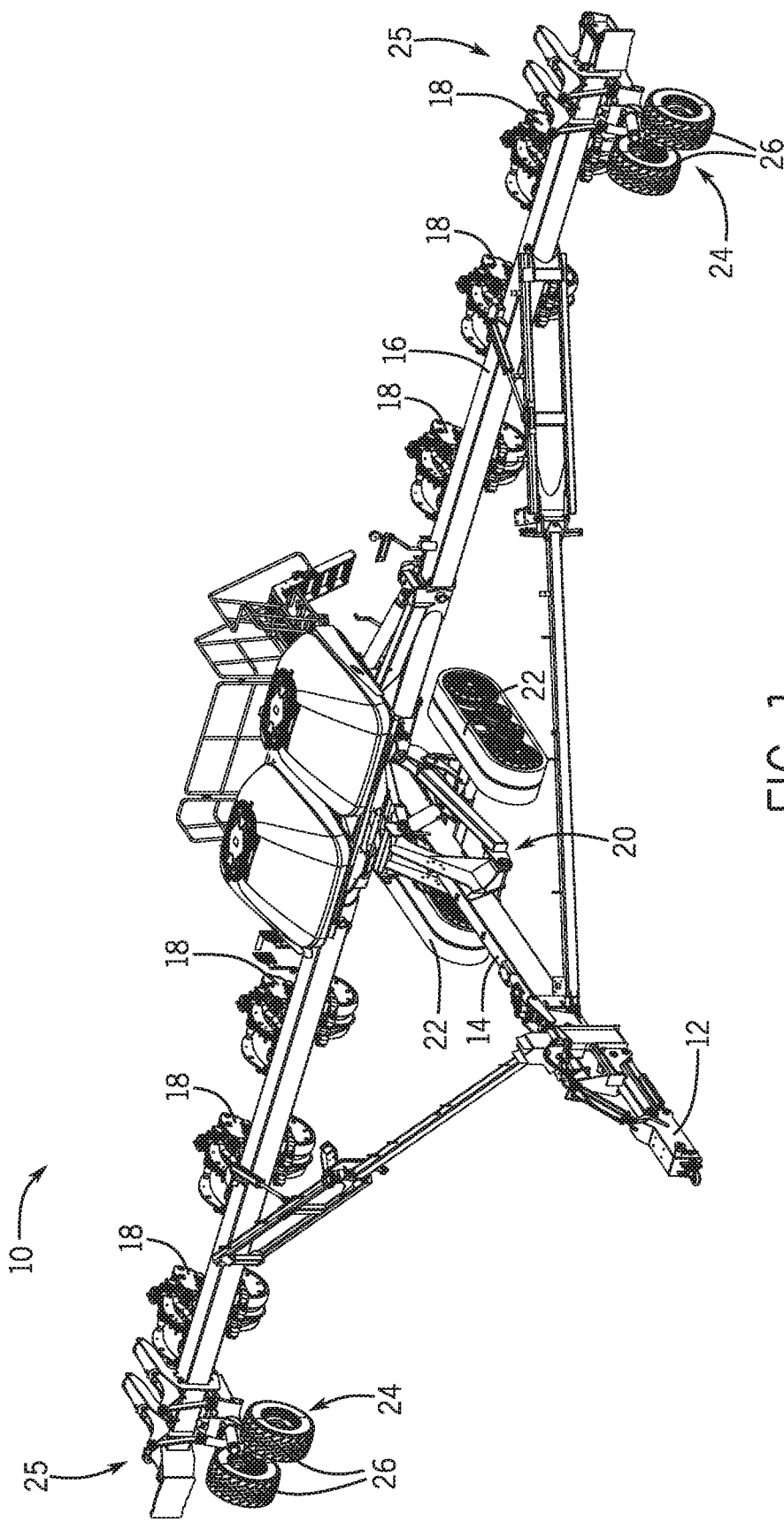
FIG. 1 is a perspective view of an agricultural implement having a caster wheel assembly disposed proximate to a distal end of each wing of a tool bar, in accordance with an embodiment of the present approach.

FIG. 1 is a perspective view of an embodiment of an agricultural implement 10. The agricultural implement 10 (e.g., a planter) is configured to be towed through a field behind a work vehicle, such as a tractor. The agricultural implement 10 includes a hitch assembly 12 configured to couple the agricultural implement 10 to the work vehicle. For example, the hitch assembly 12 may include a three-point hitch, a ball, a clevis, or another suitable coupling. A tow bar 14 is coupled to the hitch assembly 12 and to a tool bar 16. As illustrated, the tool bar 16 supports multiple row units 18.

The agricultural implement 10 includes central wheel assemblies 20 coupled to the tow bar 14 and having central wheels 22 located below the tow bar 14. The agricultural implement 10 also includes a caster wheel assembly 24 on each distal end 25 of the tool bar 16, remote from the tow bar 14. Each of the caster wheel assemblies 24 includes caster wheels 26 mounted to a sub-frame, which rotates relative to a frame pivotally coupled to the tool bar 16.

The agricultural implement 10 includes actuators such as hydraulic cylinders that are configured to move the tool bar 16 into a transport configuration and a work configuration. For example, certain actuators are coupled to the tool bar 16 and to a respective caster wheel assembly 24. Such actuators are configured to rotate the caster wheels 26 into a retracted or raised position relative to the tool bar 16 to transition the agricultural implement 10 into the work configuration (e.g., ground engaging configuration). The actuators are also configured to rotate the caster wheels 26 into an extended or lowered position relative to the tool bar 16 to transition the agricultural implement 10 into the transport configuration. In certain embodiments, each caster wheel assembly 24 includes a locking assembly that, when actuated, blocks swiveling or castering movement of the caster wheels 26, thereby locking the caster wheels 26 in a desired orientation.

As noted above, the agricultural implement 10 may enter one of two configurations depending on the operation of the agricultural implement 10. For example, the agricultural implement 10 may enter a work configuration and a transport configuration, although there may be other possible configurations of the agricultural implement 10. In the work configuration, the tool bar 16 is lowered relative to the ground, such that the row units 18 engage the ground to facilitate farming operations (e.g., seeding/planting operations). During the farming operations, the caster wheels 26 may be locked in a desired orientation (e.g., substantially parallel to the direction of travel), such that the caster wheels may essentially act as fixed-orientation wheels. The tool bar 16 may be raised relative to the ground to transition the agricultural implement 10 to the transport configuration, in which the row units 18 disengage the ground. In addition, with the agricultural implement 10 in the transport configuration, the caster wheels 26 are unlocked, thereby enabling pivotal movement of the caster wheels 26. By enabling the caster wheels 26 to caster, the caster wheels 26 may find equilibrium during a turn and more easily follow the path/motion of the agricultural implement 10. For example, the caster wheels 26 may naturally follow an arc to maintain equilibrium as the agricultural implement 10 turns/rotates. Accordingly, the agricultural implement 10 may execute sharper turns.

FIG. 2 is a perspective view of the caster wheel assembly 24 in the transport configuration, in which the caster wheels 26 of the caster wheel assembly 24 are fully released/unlocked to facilitate swiveling. As illustrated, the caster wheel assembly 24 is pivotally coupled to the tool bar 16 via a connecting linkage assembly 40, and the connecting linkage assembly 40 is configured to control movement of the caster wheels 26 relative to the tool bar 16. In the illustrated embodiment, the connecting linkage assembly 40 includes two connecting linkages 41. However, it should be appreciated that in alternative embodiments, the connecting linkage assembly may include more or fewer connecting linkages (e.g., 1, 2, 3, 4, or more). In the illustrated embodiment, each connecting linkage 41 includes a first connecting link 42 and a second connecting link 43. Each first connecting link 42 is pivotally coupled to a frame 45 of the caster wheel assembly 24 at a first pivot joint 44, and each first connecting link 42 is pivotally coupled to a respective second connecting link 43 at a second pivot joint 46. In addition, each second connecting link 43 is pivotally coupled to a respective actuator 47 of an actuator assembly 48 at a third pivot joint 50. The connecting linkages 41 may be actuated by the actuator assembly 48 to drive the frame 45 to pivot about fourth pivot joints 52, thus lowering or raising the caster wheels 26 relative to the tool bar 16. In the illustrated embodiment, the frame 45 includes two support members 54 and a base member 55. While the illustrated embodiment includes two support members 54, it should be appreciated that in alternative embodiments, the frame may include more or fewer support members (e.g., 1, 2, 3, 4, or more), each rotatably coupled to the tool bar 16 by a respective fourth pivot joint.

Furthermore, as the caster assembly 24 is transitioned to the illustrated transport configuration, the caster wheels 26 may be released to caster via a locking assembly 56. The caster wheel assembly 24 further includes a caster wheel sub-frame 57, having a wheel cylinder 58. The caster wheels 26 are rotatably coupled to the caster wheel sub-frame 57. The wheel cylinder 58 is rotatably coupled to the frame 45 and is configured to enable the sub-frame 57, and the caster wheels 26 coupled thereto, to rotate about a longitudinal axis 59 of the wheel cylinder 58 (e.g., in castering movement). A first portion of the locking assembly 56 is coupled to the frame 45, and a second portion of the locking assembly 56 is coupled to the sub-frame 57. The locking assembly 56 is configured to lock or restrain the caster wheels 26 from castering while the caster wheels 26 are in a retracted position (e.g., while the caster wheel assembly 24 is in the work configuration), and to unlock the caster wheels 26 while the caster wheels 26 are in an extended position (e.g., while the caster wheel assembly 24 is in the transport configuration).

In the illustrated embodiment, the locking assembly 56 includes a locking structure, such as the illustrated locking plate 60, a lock lever 62, and driving elements 68. The locking plate 60 is mounted to the caster wheel sub-frame 57 and has a slot 70. The lock lever 62 includes a locking portion 64 (e.g., T-shaped plate) having a locking element, such as the illustrated protrusion 72, and the lock lever 62 includes a release element 66 (e.g., plate). Each driving element 68 is coupled to a respective first connecting link 42, and the driving elements 68 are configured to contact the release element 66 of the lock lever 62. The locking plate 60 is configured to block rotation of the sub-frame 57 relative to the frame 45 while the locking element 72 is engaged with the locking plate 60, and the driving element 68 is configured to contact the release element 66 as the connecting linkages 41 move the frame 45 downwardly relative to the tool bar 16 to drive the locking element 72 to disengage the locking plate 60. The slot 70 of the locking plate 60 is configured to receive the the locking element 72 (e.g., protrusion) of the locking portion 64 of the lock lever 62. As such, when the locking element 72 is engaged with the slot 70, the locking plate 60, and thus the caster wheel sub-frame 57, connected thereto, are blocked from rotation about the longitudinal axis 59 of the wheel cylinder 58, thereby locking the caster wheels 26 into a non-castering position (e.g., in which the caster wheels 26 act as fixed-orientation wheels).

The locking assembly 56 enables the caster wheels 26 to be unlocked/released (e.g., free to caster) while the caster wheels 26 are lowered to the transport position. For example, as set forth above, each driving element 68 coupled to the respective first connecting link 42 is configured to contact the release element 66 as the connecting linkages 41 move the frame 45 downwardly relative to the tool bar 16, thereby driving the locking element 72 to disengage the locking plate 60. While the locking element 72 is out of the slot 70 (e.g., while the caster wheels 26 are in the illustrated lowered position), the locking plate 60 and the caster wheel sub-frame 57, which is connected thereto, may rotate about the longitudinal axis 59 of the wheel cylinder 58, thereby enabling the caster wheels 26 to caster.

Figure 3:
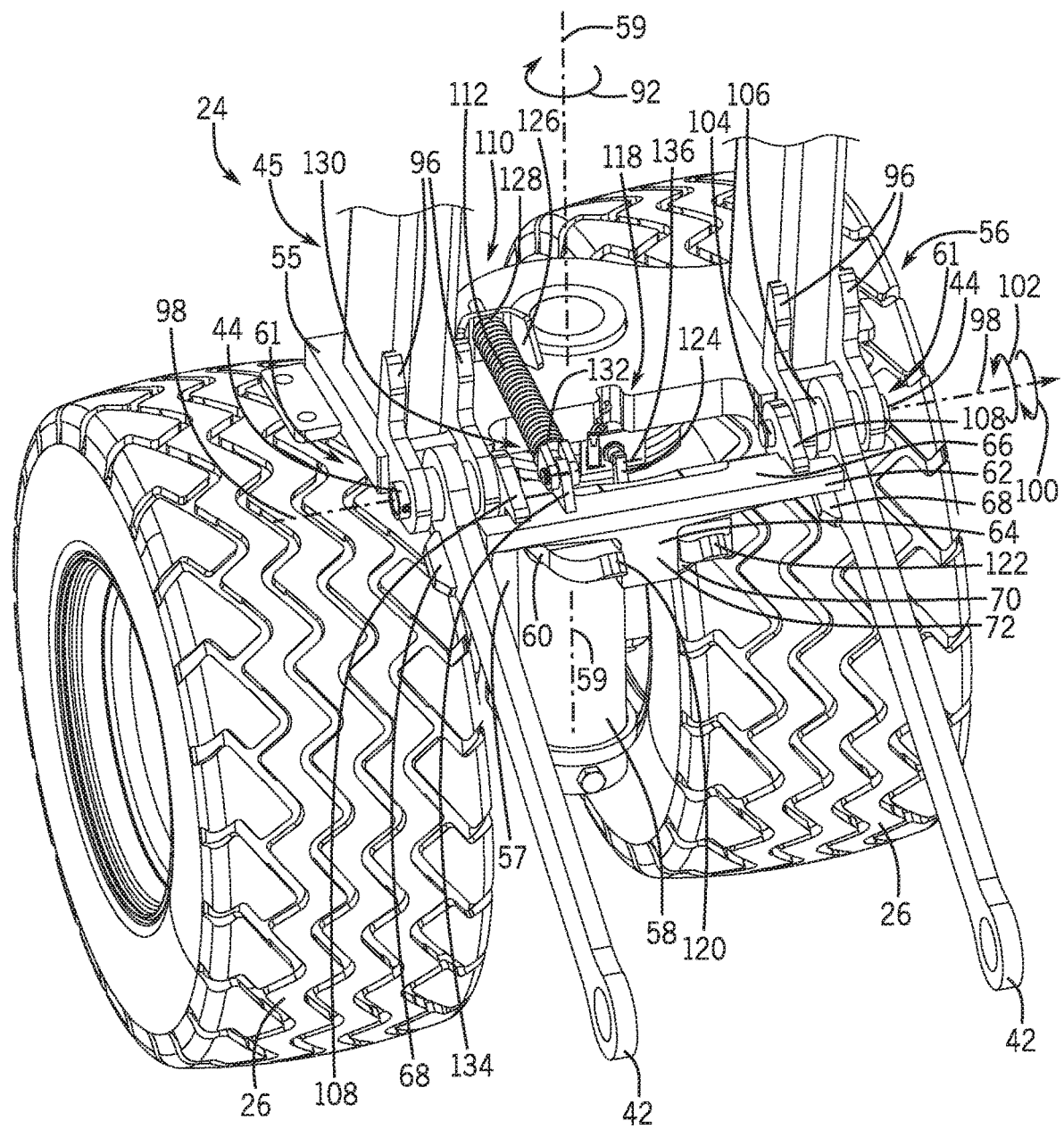
FIG. 3 is a perspective view of the caster wheel assembly of FIG. 2, illustrating details of the locking assembly configured to selectively lock and unlock the caster wheels via the lock lever, in accordance with an embodiment of the present approach.

FIG. 3 is a perspective view of the caster wheel assembly 24 of FIG. 2, illustrating details of the locking assembly 56 configured to lock and unlock the caster wheels 26 via the lock lever 62. In the illustrated embodiment, the locking assembly 56 includes the locking plate 60, the lock lever 62 having the locking portion 64 and the release element 66, and the driving elements 68 each coupled to the respective first connecting link 42. The locking plate 60 and the caster wheel sub-frame 57, which is connected thereto, rotate about the longitudinal axis 59 of the wheel cylinder 58. For example, the locking plate 60 may rotate in rotational directions indicated by arrows 92. Each first connecting link 42 is pivotally coupled to the base member 55 of the frame 45 at the first pivot joint 44. In the illustrated embodiment, each first pivot joint 44 includes a shaft assembly 61, which is coupled to the frame 45 via supports 96. Each first connecting link 42 and the lock lever 62 are pivotally or movably coupled to the frame 45 via a respective shaft assembly 61. As such, each first connecting link 42 and the lock lever 62 may rotate about an axis 98 of the shaft assemblies 61 in a first rotational direction 100 and in a second rotational direction 102. In the illustrated embodiment, each shaft assembly 61 includes an inner shaft 104 and a hollow outer casing 106 circumferentially disposed about the inner shaft 104. Each connecting link 42 is rigidly and non-rotatably coupled to the outer casing 106 of a respective shaft assembly 61. The outer casing 106 is configured to rotate relative to the inner shaft 104 such that each first connecting link 42, which is coupled thereto, rotates relative to the inner shaft 104.

A support 96 is rigidly and non-rotatably coupled to a distal end of each respective inner shaft 104 to couple the shaft assembly 61 to the frame 45. The lock lever 62 is rotatably coupled to the inner shaft 104 of each shaft assembly 61 via a connector 108, which is configured to rotate relative to the inner shaft 104. In addition, a biasing assembly 110 is configured to urge the lock lever 62 to pivot downwardly about the inner shaft 104 in the first rotational direction 100. In the illustrated embodiment, the biasing assembly 110 includes a biasing member 112 (e.g., a spring), a flange 126 that fixedly couples a first distal end 128 of the biasing member 112 to the base member 55 of the frame 45, and a mounting assembly 130 that rotatably couples a second distal end 132 of the biasing member 112 to the release element 66 of the lock lever 62 via a mount 134. The mounting assembly 130 is configured to enable the mount 134 to rotate about an axis 136, which is parallelly aligned with the axis 98 of the shaft assembly 61. As such, the lock lever 62 is rotatably coupled to both the shaft assembly 61 and the mounting assembly 130. In addition, the lock lever 62 experiences a biasing force exerted by the biasing assembly 110 in the first rotational direction 100 (e.g., to urge the locking element 72 toward engagement with the locking plate 60).

The connecting linkages 41 are actuated by the actuator assembly 48 to drive the frame 45 to pivot about the fourth pivot joints 52, thus lowering or raising the caster wheels 26 relative to the tool bar 16. Actuating the respective actuators 47 to rotate the first connecting links 42 in the first rotational direction 100 raises the caster wheels 26 relative to the tool bar 16. The connecting linkages 41 rotates relative to the base element 55 so the driving elements 68 enable the biasing assembly 110 to drive the locking element 72 into the slot 70 when the caster wheels 26 are in the raised position. It should be appreciated that the biasing force (e.g., rotational force in the first rotational direction 100) exerted by the biasing assembly 110 may hold the locking element 72 in engagement with the locking plate 60 while the caster wheels 26 are in the raised position.

Actuating the respective actuators 47 to rotate the first connecting links 42 in the second rotational direction 102 lowers the caster wheels 26 relative to the tool bar 16 toward the transport position. As such, each driving element 68, which is coupled to the respective first connecting link 42, contacts the release element 66 as the connecting linkages 41 move the frame 45 downwardly relative to the tool bar 16, thereby driving the locking element 72 out of the slot 70, which unlocks the caster wheels 26 and enables the caster wheels 26 to caster. In alternative embodiments, the slot 70 and the locking element 72 may be hole and pin or other arrangement. Although the biasing member 112 is a spring in the illustrated embodiment, the biasing member 112 could also be another device, e.g., resilient material, air cylinder, etc. It should be appreciated that in alternative embodiments, the locking/unlocking of the caster wheels 26 may be achieved via other mechanism. For example, the biasing assembly 110 may be replaced by an actuator assembly, such as a hydraulic cylinder system, and the driving elements 68 may be removed, as will be discussed in FIG. 6.

In the illustrated embodiment, the caster wheel assembly 24 includes a position or alignment sensor 118 configured to output a signal indicative of alignment of the locking element 72 with respect to the slot 70. For example, the alignment sensor 118 may detect the orientation of the caster wheel sub-frame 57 relative to the frame 45, thereby enabling a controller to determine when the locking element 72 is in alignment with the slot 70. In the illustrated embodiment, the position sensor 118 faces the lock lever 62 and is substantially centered relative to the shaft assemblies 61 (e.g., the distances from the position sensor 118 to each of the shaft assemblies 61 are approximately equal). An alignment element, such as the illustrated protrusion 124, is mounted on the locking plate 60 at a centered position relative to two opposing protrusions 120 and 122 on opposite sides of the slot 70 (e.g., the distance from the protrusion 124 to one protrusion 120 is approximately equal to the distance from the protrusion 124 to the other protrusion 122). The position sensor 118 is configured to detect the position of the protrusion 124 as the caster wheel sub-frame 57 rotates about the longitudinal axis 59 of the wheel cylinder 58 in the directions 92. For example, the position sensor 118 may be configured to determine whether the protrusion 124 is located within a threshold distance of the position sensor 118 (e.g., within 10 mm, within 5 mm, within 1 mm, etc.). It may be appreciated that the position sensor 118 could be contact sensor or non-contact sensor, proximity sensor, inductive sensor, ultrasonic sensor, Hall effect sensor, electromechanical switch, etc. While the caster wheels 26 are substantially aligned with the direction of travel of the agricultural implement 10, the wheel cylinder 58 is at about a zero degree angle about the longitudinal axis 59 (e.g., the rotational axes of the caster wheels 26 are in parallel alignment with the axis 98 of the shaft assemblies 61). In some embodiments, the actuator assembly 48 may raise the caster wheels 26 into the working configuration only when the protrusion 124 is substantially aligned with the position sensor 118 (e.g., the caster wheels 26 are aligned for the work configuration). A transition from the transport configuration to the work configuration is shown in FIGS. 4 and 5 below.

Figure 4:
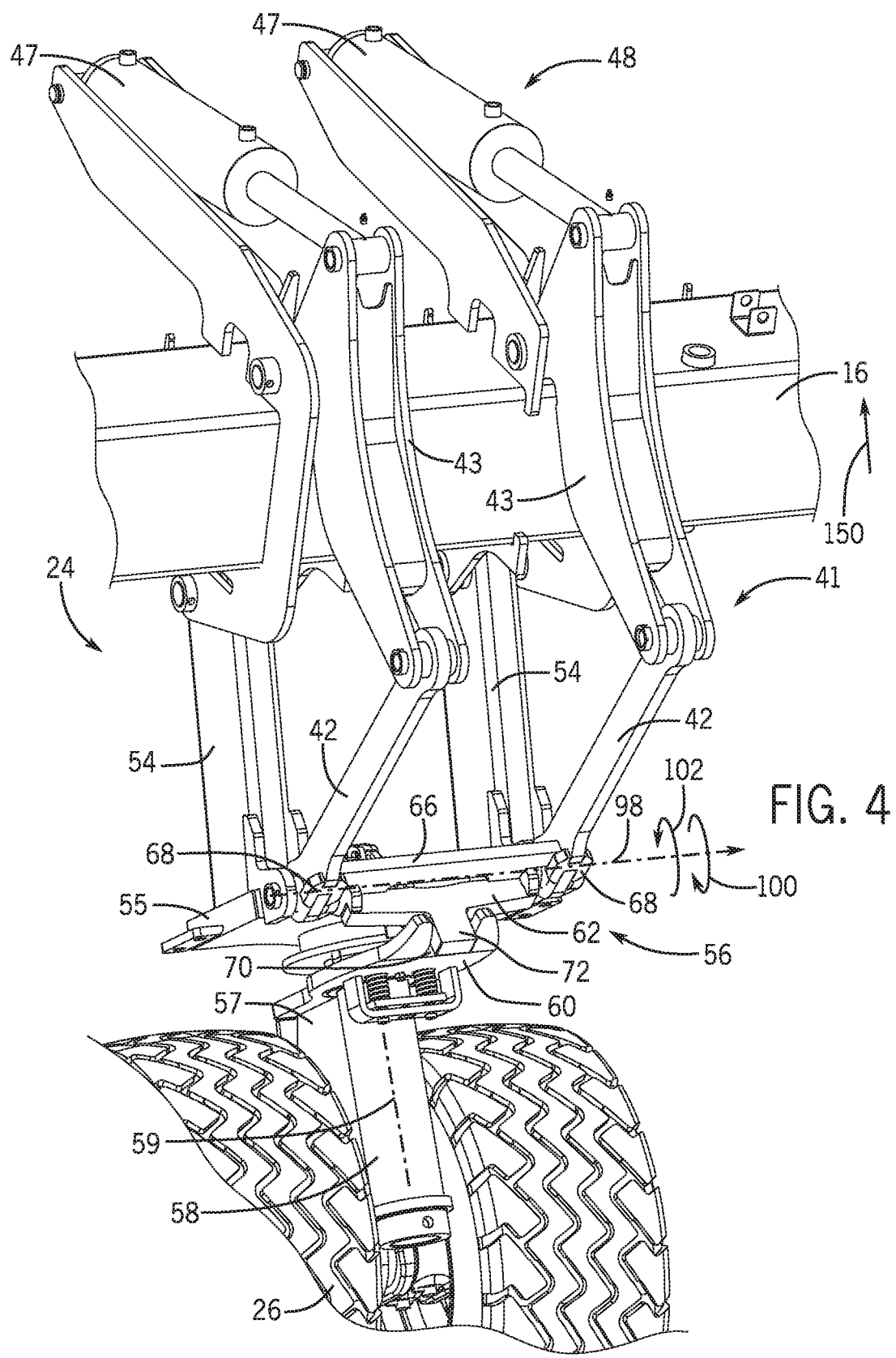
FIG. 4 is a perspective view of the caster wheel assembly of FIG. 2, in which the lock lever is in transition between the fully released position and a locked position, in accordance with an embodiment of the present approach.

FIG. 4 is a perspective view of the caster wheel assembly 24 of FIG. 2, in which the locking assembly 56 is in transition from the transport configuration to the work configuration (i.e., the lock lever 62 is in transition between a fully released position and a locked position). In certain embodiments, a controller may only enable the actuator assembly 48 to transition the caster wheels 26 from the transport configuration to the work configuration while the cater wheels 26 are aligned for the work configuration (e.g., the protrusion 124 is positioned within a threshold distance of the position sensor 118). In the illustrated embodiment, the connecting linkages 41 are actuated by the actuators 47 to pivot the support members 54 upwardly in a direction 150. As such, the caster wheel sub-frame 57 is moved upwardly relative to the tool bar 16, causing the caster wheels 26 to raise relative to the tool bar 16. The first connecting links 42 and the driving element 68 rotate away from the support members 54, thereby enabling the lock lever 62 to rotate toward the locking plate 60 due to the force applied by the biasing member 112. As a result, the locking element 72 moves toward the slot 70 of the locking plate 60, as shown in FIG. 4.

FIG. 5 is a perspective view of the caster wheel assembly 24 of FIG. 2, in which the locking assembly 56 is in the work configuration (i.e., the lock lever 62 is in the locked position, such that the locking assembly 56 blocks the caster wheels 26 from swiveling). As illustrated, the locking element 72 of the lock lever 62 is engaged with the locking plate 60. The locking plate 60 serves as a stop mechanism to block the lock lever 62 from pivoting further in the first rotational direction 100 due to the force applied by the biasing member 112. The driving elements 68 are disengaged from the release element 66 of the lock lever 62. The locking element 72 is engaged with the slot 70 of the locking plate 60 such that the locking element 72 contacts a bottom 152 of the slot 70, and the caster wheels 26 are locked from castering (e.g., rotating about the the longitudinal axis 59).

FIG. 6 is a perspective view of the caster wheel assembly 24 having another embodiment of a locking assembly 160. In the illustrated embodiment, an actuator assembly 162 includes an actuator 163 (e.g., hydraulic cylinder) configured to drive the lock lever 62 to engage the locking plate 60 to lock the caster wheels 26 and to disengage the locking plate 60 to unlock the caster wheels 26. The actuator assembly 162 includes the actuator 163 (e.g., hydraulic cylinder), a valve assemble 164, and a controller 168. While the actuator 163 is a hydraulic cylinder in the illustrated embodiment, it should be appreciated that in alternative embodiments, the actuator 163 may include multiple hydraulic cylinders, one or more pneumatic actuators, one or more electromechanical actuators, or a combination thereof, among other actuator(s). The actuator 163 includes axial ends 170 and 172. The axial end 170 is fixedly coupled to the flange 126, and the axial end 172 is coupled to the mount 134, which is fixedly coupled to the release element 66 of the lock lever 62. The valve assembly 164 includes at least one valve (e.g., needle valve, orifice valve, or any other suitable valve) that is pneumatically coupled to the hydraulic cylinder 163 and configured to control or regulate the fluid pressure and/or fluid flow to the hydraulic cylinder 163. The controller 168 may receive instructions to control the hydraulic cylinder 163. The valve assembly 164 may control pneumatic actuator or control electromechanical actuator directly. Accordingly, the controller 168 may control the valve assembly 164, thereby control the hydraulic cylinder 163.

The controller 168 includes a memory 176 (e.g., a non-transitory computer-readable medium/memory circuitry) storing one or more sets of instructions (e.g., processor-executable instructions) implemented to operate the valve assembly 164. The controller 168 also includes one or more processors 178 configured to access and execute the one or more sets of instructions encoded on the memory 176 (e.g., to control the valve assembly 164). For example, the memory 176 may include volatile memory, such as random access memory (RAM), and/or non-volatile memory, such as read-only memory (ROM), optical drives, hard disc drives, or solid-state drives. Additionally, the one or more processors 178 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

While the caster wheel assembly 24 is in the work configuration, the controller 168 may instruct the valve assembly 164 to drive the hydraulic cylinder 163 to rotate the lock level 62 in the first rotational direction 100 such that the locking element 72 engages the slot 70 of the locking plate 60, thereby locking the caster wheels 26 into a non-castering configuration. The controller 168 may ouptput this instructions based on input from a user, input from the position sensor 118 (e.g., indicative of substantial alignment of the locking element 72 with the slot 70), input from frame position sensor (e.g., indicative of the frame being in the raised position), or a combination thereof, among other inputs. While the caster wheel assembly 24 is lowered to the transport configuration, the controller 168 may instruct the vavle assembly 164 to the hydraulic cylinder 163 to rotate the lock lever 62 in the second rotational direction 102 such that the locking element 72 is moved out of the slot 70 of the locking plate 60, thereby enabling the caster wheels 26 to caster and swivel about the longitudinal axis 59. The controller 168 may output the instructions based on user input, input from the frame position sensor (e.g., indicative of the frame being in an at least partially lowered position), or a combination thereof, among other inputs. Due to the implementation of the actuator assembly 162, the locking assembly 160 does not include the release element 66 and the driving elements 68 to drive the locking element 72 to disengage the locking plate 60. Due to the implementation of the actuator assembly 162, the locking assembly 160 does not include the biasing member 112 (e.g., a spring) to drive the lock lever 62 rotating in the first rotational direction 100 such that the locking element 72 engages the slot 70. The valve assembly 164 upon receiving instructions from the controller 168 may maintain the hydraulic cylinder 163 in an extended position to hold the locking element 72 in engagement with the locking plate 60.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A caster wheel assembly for an agricultural implement system, comprising:
    a frame configured to pivotally couple to a tool bar of the agricultural implement system via a mount;
    a sub-frame rotatably coupled to the frame;
    at least one connecting linkage configured to control movement of the frame relative to the tool bar;
    a locking assembly, comprising:
        a lock lever movably coupled to the frame, wherein the lock lever comprises a locking element and a release element;
        a locking structure fixedly coupled to the sub-frame; and
        a driver fixedly and non-movably coupled to the at least one connecting linkage, such that the driver moves with the at least one connecting linkage, wherein the locking element is configured to block rotation of the sub-frame relative to the frame while the locking element is engaged with the locking structure, and the driver is configured to contact the release element as the at least one connecting linkage moves the frame downwardly relative to the tool bar to drive the locking element to disengage the locking structure; and
    at least one actuator configured to drive the at least one connecting linkage to move the frame and the driver relative to the tool bar.

2. The caster wheel assembly of claim 1, wherein the at least one connecting linkage comprises a pair of connecting linkages, and the driver comprises a first driver fixedly and non-movably coupled to a first connecting linkage of the pair of connecting linkages and a second driver fixedly and non-movably coupled to a second connecting linkage of the pair of connecting linkages.

3. The caster wheel assembly of claim 2, wherein the lock lever extends between the pair of connecting linkages.

4. The caster wheel assembly of claim 1, wherein the lock lever is pivotally coupled to the frame about a shaft assembly.

5. The caster wheel assembly of claim 1, wherein the locking structure comprises a locking plate, and the locking plate has a slot configured to receive the locking element of the lock lever to block rotation of the sub-frame relative to the frame.

6. The caster wheel assembly of claim 5, comprising a sensor configured to output a signal indicative of substantial alignment of the locking element with the slot.

7. The caster wheel assembly of claim 1, comprising a biasing member configured to urge the locking element of the lock lever into engagement with the locking structure.

8. The caster wheel assembly of claim 7, wherein the biasing member comprises a spring having a first distal end and a second distal end, wherein the first distal end is coupled to the frame, and the second distal end is coupled to the release element of the lock lever.

9. A caster wheel assembly for an agricultural implement system, comprising:
    a frame configured to pivotally couple to a tool bar of the agricultural implement system via a mount;
    a sub-frame rotatably coupled to the frame;
    a locking assembly, comprising:
        a lock lever pivotally and directly coupled to the frame by a shaft assembly, wherein the lock lever comprises a locking element;
        a locking structure fixedly coupled to the sub-frame; and
        an actuator assembly comprising an actuator non-translatably and directly coupled to the frame by a flange that is separate from the shaft assembly, wherein the actuator is non-translatably and directly coupled to the lock lever by an additional mount that is separate from the shaft assembly and the flange, the locking element is configured to block rotation of the sub-frame relative to the frame while the locking element is engaged with the locking structure, and the actuator is configured to drive the lock lever in a first direction to engage the locking element with the locking structure and to drive the lock lever in a second direction, opposite the first direction, to disengage the locking element from the locking structure.

10. The caster wheel assembly of claim 9, comprising at least one connecting linkage configured to control movement of the frame relative to the tool bar.

11. The caster wheel assembly of claim 9, wherein the locking structure comprises a locking plate, and the locking plate has a slot configured to receive the locking element of the lock lever to block rotation of the sub-frame relative to the frame.

12. The caster wheel assembly of claim 11, comprising a sensor configured to output a signal indicative of substantial alignment of the locking element with the slot.

13. The caster wheel assembly of claim 9, wherein the actuator comprises a hydraulic cylinder.

14. The caster wheel assembly of claim 9, wherein the actuator assembly comprises a controller configured to instruct the actuator to move the lock lever.

15. The caster wheel assembly of claim 14, wherein the actuator comprises a hydraulic cylinder coupled to a valve assembly controlled by the controller.

16. A caster wheel assembly for an agricultural implement system, comprising:
    a frame configured to pivotally couple to a tool bar of the agricultural implement system via a mount;
    a sub-frame rotatably coupled to the frame;
    at least one connecting linkage configured to control movement of the frame relative to the tool bar;
    a locking assembly, comprising:
        a lock lever pivotally coupled to the frame about a shaft assembly, wherein the lock lever comprises a locking element and a release element;
        a locking structure fixedly coupled to the sub-frame, wherein the locking structure comprises a locking plate, and the locking plate has a slot configured to receive the locking element of the lock lever to block rotation of the sub-frame relative to the frame;

a driver fixedly and non-movably coupled to the at least one connecting linkage, such that the driver moves with the at least one connecting linkage, wherein the driver is configured to contact the release element as the at least one connecting linkage moves the frame downwardly relative to the tool bar to drive the locking element to disengage the locking structure;

a biasing member configured to urge the locking element of the lock lever into engagement with the locking structure; and at least one actuator configured to drive the at least one connecting linkage to move the frame and the driver relative to the tool bar.

17. The caster wheel assembly of claim 16, wherein the biasing member has a first distal end and a second distal end, wherein the first distal end is coupled to the frame, and the second distal end is coupled to the release element of the lock lever.

18. The caster wheel assembly of claim 16, wherein the biasing member comprises a spring.

* * * * *